R. A. McGONIGAL.
ANTISKID DEVICE.
APPLICATION FILED SEPT. 8, 1921.
1,410,690.
Patented Mar. 28, 1922.
2 SHEETS—SHEET 2.
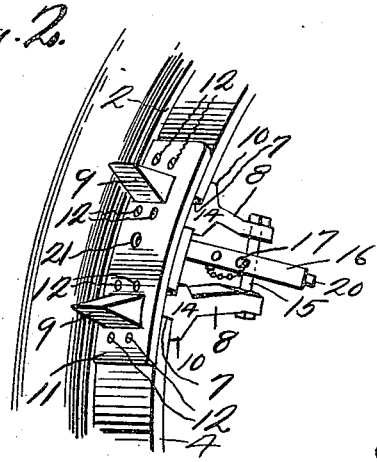
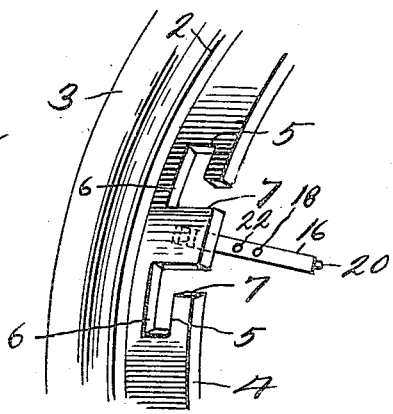
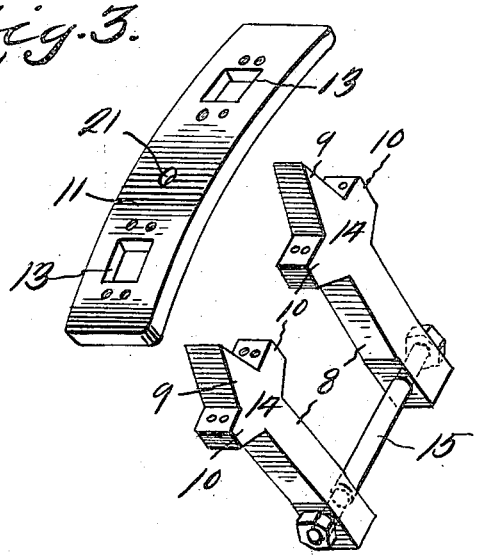
Inventor
Roderich A. McGonigal
By Philip A. H. Ferrell
his Attorney

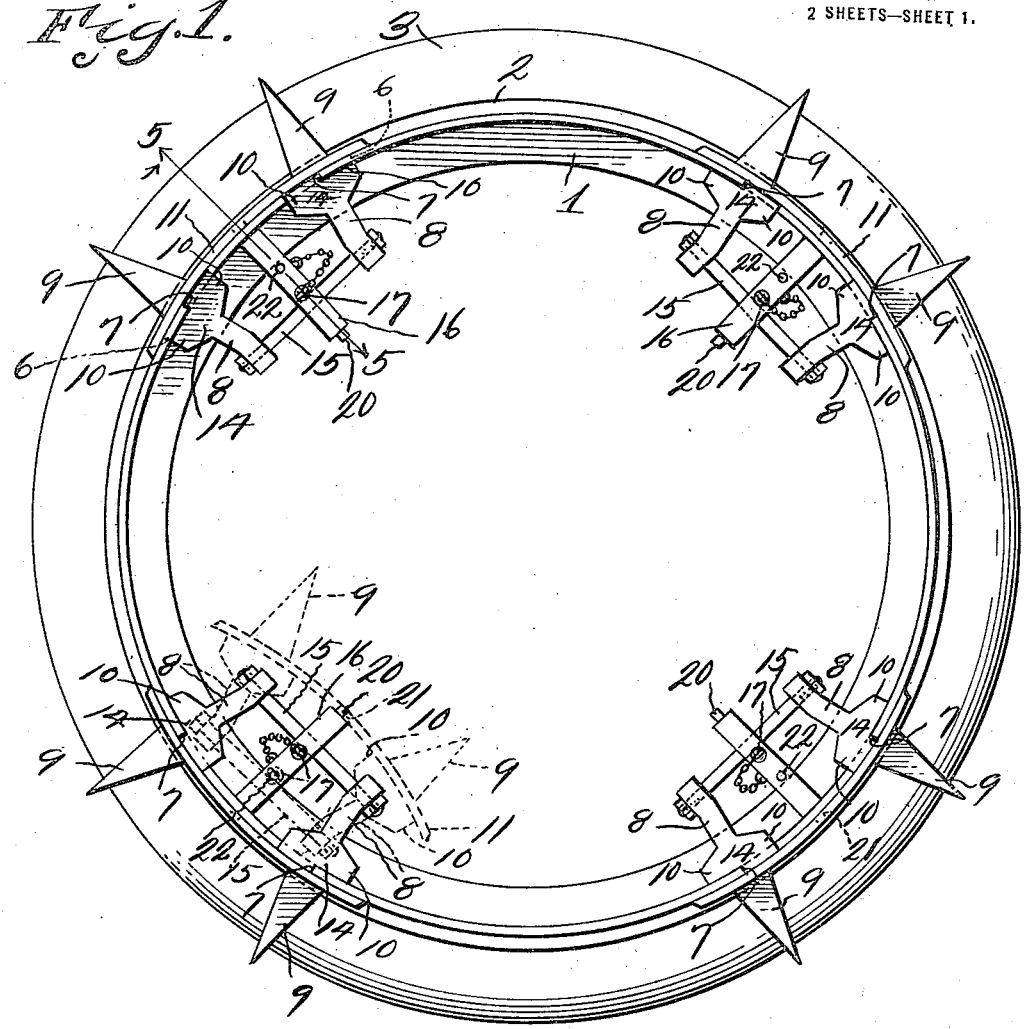
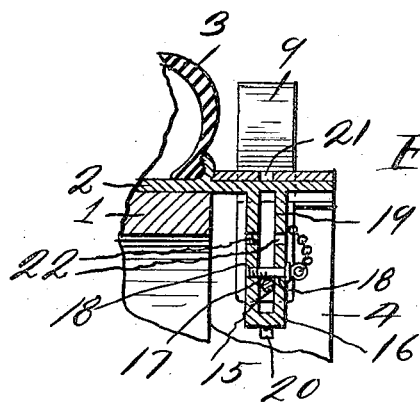

UNITED STATES PATENT OFFICE.

RODERICK A. McGONIGAL, OF BRIDGEPORT, OHIO.

ANTISKID DEVICE.

1,410,690.   Specification of Letters Patent.   Patented Mar. 28, 1922.

Application filed September 8, 1921. Serial No. 499,153.

*To all whom it may concern:*

Be it known that I, RODERICK A. McGONIGAL, citizen of the United States, residing at Bridgeport, in the county of Belmont and State of Ohio, have invented certain new and useful Improvements in Antiskid Devices, of which the following is a specification, reference being had therein to the accompanying drawings.

The invention relates to anti-skid devices and has for its object to provide a device of this character, carried by an auxiliary rim on the automobile wheel and provided with a plurality of spaced pairs of ground engaging elements, which elements are carried by segmentally shaped members adapted to be disposed on the outer periphery of the auxiliary rim when the elements are extended, and on the inner ends of inwardly extending brackets when the elements are inwardly disposed. Also to provide L-shaped spaced slots in the auxiliary rim for the reception of reduced portions of the ground engaging elements, and enlarged portions of said elements after they have been placed in position, and held therein by means of a pin extending through the brackets and over a connecting rod between the inner ends of the elements.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a conventional form of automobile wheel, showing the plurality of the anti-skidding devices applied thereto.

Figure 2 is a detail perspective view of a portion of the vehicle wheel, showing one of the pairs of ground engaging elements applied thereto.

Figure 3 is a detail collective view in perspective of the ground engaging elements and the segmental plate carried thereby.

Figure 4 is a perspective view of a portion of the automobile wheel and auxiliary rim.

Figure 5 is a sectional view through the supporting brackets and a portion of the wheel and rim taken on line 5—5 of Figure 1.

Referring to the drawings, the numeral 1 designates the felly of a conventional form of automobile wheel, and 2 a rim carried thereby, which rim holds a conventional form of pneumatic tire 3. Extending outwardly from the rim 2 is an auxiliary annular rim 4, which rim is provided with spaced pairs of L-shaped recesses 5, the portions 6 of which are circumferentially disposed, and the portions 7 extending outwardly, and sufficiently wide to receive the shanks 8 of ground engaging elements 9. The ground engaging elements 9 may be any shape desired, and preferably extend beyond the periphery of the tire 3, and pierce the ground for preventing skidding of the wheels or spinning of the wheels. The ground engaging elements 9 at their inner ends are provided with oppositely disposed lugs 10, which lugs engage the inner surfaces of segmentally shaped plates 11, and are secured thereto by means of screws 12 in such a manner that the ground engaging elements 9 project through the apertures 13 in said plates 11. When the pairs of ground engaging elements are extended, the shanks 8 pass through the portions 7 of the L-shaped recesses 5, and then upon an inward movement of the device, the enlarged portions 14 are received in the recesses 6 in such a manner that they are held firmly against outward displacement and against inward movement by the engagement of the inner side of the plate 11 with the periphery of the auxiliary rim 4. The inner ends of the shanks 8 of each pair of anti-skidding members are connected together by a bolt 15, which bolt passes through a U-shaped bracket 16, and is held in the position shown in Figure 5 when the ground engaging elements are extended by means of the screw 17, which passes through registering apertures 18 in the arms of the U-shaped brackets 16. It will be seen that when the pin is in engagement with the bolt 15 as shown in the drawings, that the semi-circular plate 11 will be securely held in engagement with the outer periphery of the flange 4, thereby maintaining the ground engaging elements in extended position.

When it is desired to position the ground engaging elements inwardly as shown in dotted lines in Figure 1, the screw 17 is removed, the ground engaging elements and the segmentally shaped plate 11 carried thereby are moved outwardly, which action will bring the bolt 15 to a point adjacent the inner end 19 of the U-shaped bracket 16, after which the device may be turned on the bolt 15 as a pivotal point and reversed in position to the position shown in dotted lines in Figure 1, and held in said position by means of the lug 20 carried by the inner end of the bracket engaging in an aperture 21 in the segmentally shaped plate 11, and by means of the screw 17 which has been passed through the registering apertures 22 in the arms of the U-shaped bracket 16, which screw engages the inner side of the bolt 15.

It is to be understood that the auxiliary flange 4 may be attached in any suitable manner to the vehicle wheel, however for purposes of illustration, it is shown as an extension to the rim 2.

From the above it will be seen that an auxiliary rim is provided for an automobile wheel which rim carries a plurality of extensible ground engaging members which may be easily and quickly positioned for use or placed in inoperative position where they will not interfere with the rotation of the wheel at times when they are not needed.

The invention having been set forth what is claimed as new and useful is:—

1. The combination with a vehicle wheel comprising a felly, a rim carried by said felly and a resilient tire carried by said rim, of an anti-skidding device therefor, said device comprising an annular rim extending outwardly from the wheel, inwardly extending brackets carried by said annular rim, spaced ground engaging elements carried by semi-circular plates, recesses in the annular rim for the reception of the ground engaging elements and means whereby said ground engaging elements may be secured in extended or collapsed positions.

2. The combination with an annular auxiliary rim carried by a vehicle wheel, of anti-skidding devices carried by said rim, said anti-skidding device comprising ground engaging elements, said ground engaging elements being provided with enlargements, a segmentally shaped plate through which the ground engaging elements extend and with the inner side of which the enlargements engage, the inner ends of said ground engaging elements being connected together by a bar, a U-shaped bracket extending inwardly from the inner side of the rim, and in which bracket said bar is disposed, a pin carried by the inner end of the bracket and adapted to be received by an aperture in the segmentally shaped plate when the same is inwardly disposed, recesses in the annular rim for the reception of the enlargements of the ground engaging elements and means extending through the U-shaped bracket and cooperating with the bar for holding the ground engaging elements in operative or inoperative positions.

3. An anti-skidding device for vehicle wheels having an annular auxiliary tread, said device comprising spaced ground engaging elements carried by a segmentally shaped plate through which said ground engaging elements extend, and to which they are secured, enlargements carried by said ground engaging elements adjacent the inner sides of the segmentally shaped plate, the inner ends of said ground engaging elements being connected together by a bar, a U-shaped bracket in which said bar is disposed, the inner ends of the elements being narrower than the entrances to L-shaped recesses in the rim, which recesses receive the enlargements of the elements and means carried by the bracket for holding the device in extended or inoperative positions.

In testimony whereof I hereunto affix my signature.

RODERICK A. McGONIGAL.